United States Patent [19]

Dirksing et al.

[11] Patent Number: 4,729,880
[45] Date of Patent: Mar. 8, 1988

[54] ARTICLE FOR MAINTAINING MORE EVEN CONCENTRATIONS OF BLEACH IN A PASSIVE DOSING DISPENSER

[75] Inventors: Robert S. Dirksing, Cincinnati; Bruce Brown, Fairfield; Ray D. Lotts, Cincinnati; Louis F. Wong, Mason, all of Ohio

[73] Assignee: The Procter & Gamble Company, Cincinnati, Ohio

[21] Appl. No.: 727,611

[22] Filed: Apr. 29, 1985

Related U.S. Application Data

[63] Continuation of Ser. No. 452,543, Dec. 23, 1982, abandoned.

[51] Int. Cl.⁴ ............................................. F03D 9/03
[52] U.S. Cl. .................................. 422/264; 422/266; 422/275; 4/222.1; 4/227; 4/228; 222/424.5
[58] Field of Search ............... 422/37, 264, 266, 267, 422/275; 4/222.1, 227, 228; 222/424.5; 137/268

[56]     References Cited
U.S. PATENT DOCUMENTS

| | | | |
|---|---|---|---|
| 3,243,263 | 3/1966 | Schoenecker | 422/264 X |
| 3,943,582 | 3/1976 | Daeninckx et al. | 4/228 X |
| 4,200,606 | 4/1980 | Kitko | 4/227 X |
| 4,216,027 | 8/1980 | Wages | 4/228 X |
| 4,230,569 | 10/1980 | Loheberg et al. | 422/37 X |
| 4,251,012 | 2/1981 | Owens et al. | 4/227 X |
| 4,353,866 | 10/1982 | Wong | 422/266 X |
| 4,382,304 | 5/1983 | Lehmann | 422/266 X |
| 4,419,771 | 12/1983 | Richards | 4/227 X |
| 4,432,102 | 2/1984 | Woodruff et al. | 4/227 X |
| 4,434,136 | 2/1984 | Wilkinson et al. | 422/263 |

FOREIGN PATENT DOCUMENTS 2090884  7/1982  United Kingdom ................ 4/227

Primary Examiner—David L. Lacey
Attorney, Agent, or Firm—Leonard Williamson; Robert B. Aylor; Richard C. Witte

[57]     ABSTRACT

An article for sanitizing toilets comprising a dosing dispenser with a calcium hypochlorite cake composition characterized in that the article is designed (when used) to dispense from 1 ml to 4 mls of a 5% to 15% liquid bleach over the life of the article. When in use, the article is designed to maintain a reserve of liquid bleach in the dispenser wherein the reservoir to dose volumetric ratio of 3:1 to 6:1.

1 Claim, 1 Drawing Figure

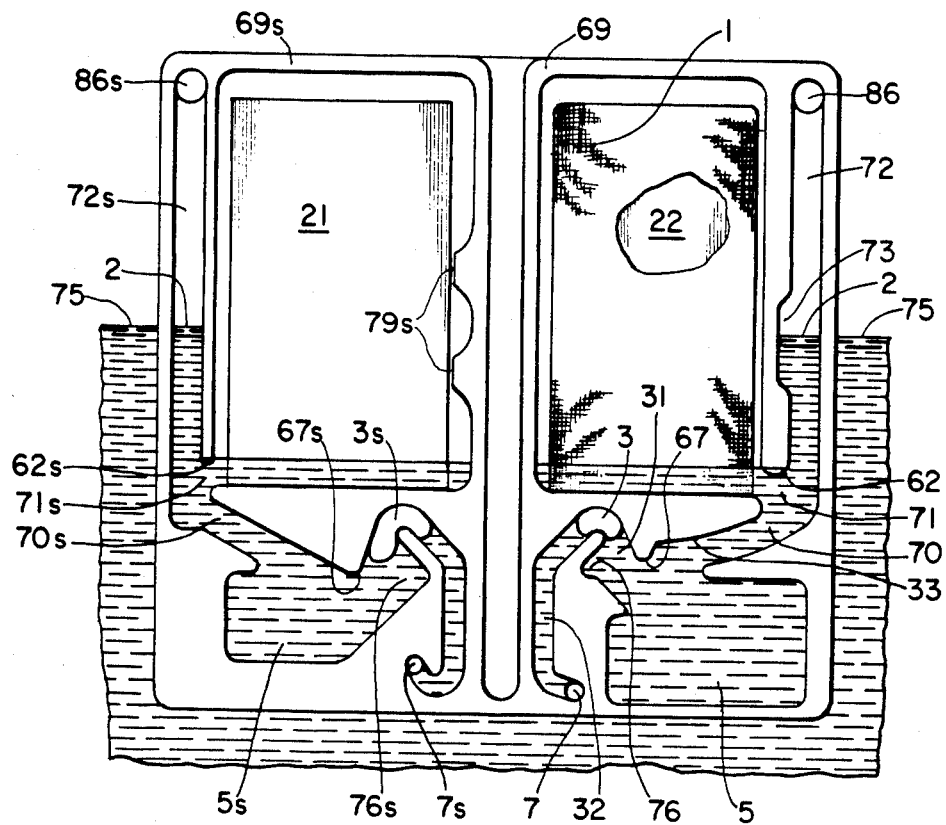

ARTICLE FOR MAINTAINING MORE EVEN CONCENTRATIONS OF BLEACH IN A PASSIVE DOSING DISPENSER

This is a continuation of application Ser. No. 452,543, filed on Dec. 23, 1982, now abandoned.

TECHNICAL FIELD

This invention relates to disinfecting devices adapted to dispense disinfectant solutions to the tank of a conventional toilet when it is flushed.

BACKGROUND ART

The following references will serve as background art for dosing dispensers and cakes of active ingredients used in combination therewith, and are incorporated herein by reference:

U.S. Pat. No. 4,171,546, Dirksing, issued Oct. 23, 1979;
U.S. Pat. No. 4,208,747, Dirksing, issued June 24, 1980;
U.S. Pat. No. 4,186,856, Dirksing, issued Feb. 5, 1980;
U.S. Pat. No. 4,216,027, Wages, issued Aug. 5, 1980;
U.S. Pat. No. 4,200,606, Kitko, issued Apr. 29, 1980;
U.S. Pat. No. 4,248,827, Kitko, issued Feb. 3, 1981;
U.S. Pat. No. 4,253,951, McCune, issued Mar. 3, 1981;
U.S. Pat. No. 4,246,129, Kacher, issued Jan. 20, 1981;
U.S. Pat. No. 4,251,012, Williams, issued Feb. 17, 1981;
U.S. Pat. No. 4,247,070, Dirksing, issued Jan. 27, 1981;
U.S. Pat. No. 4,302,350, Callicott, issued Nov. 24, 1981;
U.S. Pat. No. 4,281,421, Nyguist et al., issued Aug. 4, 1981;
U.S. Pat. No. 4,283,300, Kurtz, issued Aug. 11, 1981;
U.S. Pat. No. 4,305,162, Cornelisse, Jr. et al., Dec. 15, 1981;
U.S. Ser. No. 355,984, Mueller et al., filed Mar. 8, 1982; and European Pat. Appln. No. 0,005,286, Nyguist, published Nov. 14, 1979.

U.S. Pat. No. 3,154,495, Robson et al., issued Oct. 22, 1964, discloses articles comprising enveloped granular and small tableted hypochlorite materials.

A partially dissolving cake is disclosed in commonly owned U.S. Pat. No. 4,281,421, Nyquist, Kitko and Stradling, issued Aug. 4, 1981. The Nyquist et al. patent is directed to a partially insoluble cake comprising hypochlorite and metasilicate salts. One drawback to these cakes is that much of the hypochlorite is wasted. All of the cake is not immersed in liquid; just the lower part, and "leaching" will not dissolve the active located in the top part of the cake. Another drawback is substantial nonuniform delivery of the active.

U.S. Pat. No. 4,208,747, Dirksing, issued June 24, 1980, discloses highly effective dispensers which are placed in a toilet tank and which receive a dose volume of water from the toilet tank and dispense a dose volume of a solution of cleaning or disinfecting composition every time the toilet is flushed. This patent teaches that cake compositions can be used as the source of cleaning and disinfecting agents in such dispensers, but fails to address specific problems posed by certain types of cakes. One problem is that a cake of calcium hypochlorite material immersed completely in the dosing liquid tends to initially deliver excessively high levels of chlorine. Thus, the chlorine is used up too fast. FIGS. 9-14 and 18 of U.S. Pat. No. 4,208,747, Dirksing, disclose "top-feed" dispensers in which such cakes are completely immersed in the dosing liquid. There, the solution is drawn from above the cake. Such cake/dispenser combinations do not deliver a consistent amount of available chlorine over the life of the cake.

Dirksing also discloses a dosing dispenser of the "bottom-feed" type illustrated in FIGS. 1-8 and 15-17. Symmetrical rectangular-shaped cakes are used therein. In such dispensers the bleach cake is only partially immersed in dosing liquid in the reservoir. The solution is drawn from an area near the bottom of the cake.

U.S. Pat. No. 4,307,474, Choy, issued Dec. 29, 1981, discloses a passive dosing dispenser exhibiting improved resistance to gel clogging. An anti-clogging means comprising support means in the lowermost portion of the product chamber (cake compartment) and a level control means to control the level of liquid in the product chamber are also disclosed. The support means help to prevent gelled and solid chips from obstructing the flow of liquid in and out of the chamber.

Some major problems in this art have been with dissolving bleach cakes. One is dispensing even concentrations of the bleach. One cause of this is that particles from said cakes pass into the reservoir of the dispenser and thereby reduce the effective volume of liquid which is needed for rapid equilibrium and formation of the dosage of bleach which is to be dispensed in the next flush of the toilet. Further, the particles which break off the cake and pass through to the toilet water result in a loss of efficient bleach use, and some of the particles may clog the passageways through which liquid flows from the dispenser. Another problem has been that most of the effective volume of bleach liquid in the reservoir was dispensed with each dose. Yet another problem with some dispenser designs has been failure to dispense a full dose of bleach liquid each time.

SUMMARY OF THE INVENTION

The summary of the invention is an article of manufacture comprising a dosing dispenser containing a solid cake of water-soluble calcium hypochlorite within a cake compartment, said dispenser including means for allowing a dose, volume of aqueous liquid (when the article is in use) to be routed through a reservoir and into said compartment with each dispensing cycle and means for immersing a lowermost portion of the cake to a predetermined depth in said aqueous liquid to facilitate dissolving a portion of said cake for dispensing at a later time; CHARACTERIZED IN THAT:

said cake is substantially completely water-soluble; said cake weighing from 45 gms to 120 gms and having a density of from 1.5 to 2.3 gms/cc; said compartment having free space to allow the cake to gravity feed by dissolution into said aqueous liquid; said dispenser receiving from 7 to 16 mls of liquid and having a baffle means (a) to limit the size of an air bubble lock which isolates toilet tank water liquid from liquid inside the dispenser reservoir, (b) to maintain in said reservoir a volume of aqueous hypochlorite liquid which is 6 ml to 12 ml; said reservoir liquid and said dose having a volumetric ratio of from 3:1 to 6:1; said aqueous liquid in said reservoir having an average concentration of 9% to 15% said hypochlorite active, and whereby said dosing dispenser providing a substantially uniform concentration of hypochlorite solution for each dispensing cycle for the life of the cake.

An object of the present invention is to provide a dispenser and cake combination which delivers all of the available chlorine in the cake at a substantially uniform rate, over a long period of time, throughout the life of the dispenser. Another object is to provide a dispenser which does not clog. Yet another object of the present invention is to limit the size of air bubble within the air lock inside the dispenser to assure discharge of a full small dose of liquid bleach.

Other objects of the present invention will be apparent in the light of the following disclosure.

BRIEF DESCRIPTION OF THE DRAWING

Shown is a schematic view of twin passive dosing dispenser with isolated surfactant cake 21 and isolated bleach cake 22. The bleach cake 22 is enveloped in a filter sleeve particle retaining means 1.

DETAILED DESCRIPTION OF THE INVENTION

The essence of the invention is an article of manufacture comprising a dosing dispenser containing a solid cake of water-soluble calcium hypochlorite within a cake compartment, said dispenser including means for allowing a dose volume of aqueous liquid to be routed through a reservoir and into said compartment with each dispensing cycle and means for immersing a lowermost portion of the cake to a predetermined depth in said aqueous liquid to facilitate dissolving a portion of said cake for dispensing at a later time; CHARACTERIZED IN THAT: said cake is substantially water-soluble; said cake weighing from 45 gms to 120 gms and having a density of from 1.5 to 2.3 gms/cc; said cake containing sufficient free space to allow the cake to gravity feed by dissolution into said aqueous liquid;

said dispenser receives from 7 to 16 mls of liquid and has a means (a) to limit the size of the air bubble within the air lock which isolates toilet tank liquid from liquid inside the dispenser reservoir, (b) to maintain in said reservoir a volume of aqueous liquid which is 6 mls to 12 mls and to dispense from 1 ml to 4 mls dose of said liquid; said reservoir liquid and said dose having a volumetric ratio of from 3:1 to 6:1; said aqueous liquid in said reservoir has an average concentration of 9% to 15% said hypochlorite active, and whereby said dosing dispenser providing a substantially uniform concentration of hypochlorite solution for each dispensing cycle for the life of the cake.

The dispenser preferably has 6 to 12 mls. liquid bleach in reserve for fast flush situations. More about this later.

The dose volume is preferably up to about ¼th of the liquid volume reservoir.

The preferred dose volume is from 1.5 mls to 3.0 mls of a hypochlorite solution having an average concentration of from 10% to 11%.

The present invention is: an article of manufacture comprising a passive dosing dispenser containing an internal reservoir for containing a quantity of a solution isolated by means of an air bubble lock from a body of toilet tank liquid in which said dispenser is immersed and means for causing a predetermined volume of said solution to be discharged from said internal reservoir and from said dispenser in response to the level of said body of liquid being lowered from a first elevation to a second elevation, said means comprising an air vent in fluid communication with said reservoir, a first inlet/outlet passageway having an inlet/discharge exit port at its lower end, a second inlet/discharge passageway having a top end in fluid communication with the upper reaches of said first inlet/outlet passageway and a bottom end baffle in fluid communication with said internal reservoir, said internal reservoir being in fluid communication exclusively with said second inlet/outlet passageway and said air vent, said internal reservoir including a cake compartment adapted to hold a quantity of a solid-state bleach cake which is soluble in said liquid and for being flooded to a predetermined depth with said liquid to form said solution in said internal reservoir by dissolving some of said solid bleach product, said dispenser further including an air trap disposed adjacent to said second inlet/output passageway, said air trap serving to retain an air bubble as said internal reservoir is being filled by said liquid, said air trap thereafter permitting said air bubble to reposition itself when said liquid ceases to enter said internal reservoir, thereby forming said air bubble lock which isolates said solution from said liquid surrounding said dispenser, said dispenser further including means for being so disposed in said body of liquid that said liquid reservoir will be filled with a predetermined volume of said liquid when the level of said body of liquid is raised to said first elevation and so that a predetermined volume of said solution will be discharged from said internal reservoir via said second inlet/outlet passageway and discharged from said dispenser when the level of said solution in said internal reservoir is lowered to the bottom end baffle of said inlet/discharge conduit in response to said body of liquid being lowered to said second elevation, CHARACTERIZED IN THAT:

said cake is substantially water-soluble; said cake weighing from 45 gms to 120 gms and having a density of from 1.5 to 2.3 gms/cc; said cake compartment containing sufficient free space to allow the cake to gravity feed by dissolution into said aqueous liquid; said dispenser receiving from 7 to 16 mls of liquid and having a means (a) to limit the size of an air bubble within the air lock which isolates toilet tank water liquid from liquid inside the dispenser reservoir, (b) to maintain in said reservoir a volume of aqueous liquid which is 6 mls to 12 mls and to dispense 1 ml to 4 mls dose of said liquid; said reservoir liquid and said dose having a volumetric ratio of from 3:1 to 6:1; said aqueous liquid in said reservoir has an average concentration of 9% to 15% said hypochlorite active, and whereby said dosing dispenser providing a substantially uniform concentration of hypochlorite solution for each dispensing cycle for the life of the cake.

The Particle Retaining Filter Means

A preferred filter means is a filter sleeve of water-permeable laid fibers which envelopes a calcium hypochlorite based bleach cake, which cake weighs 45 to 120 gms and has a density of 1.3 to 2.3 gms/cc. The particle retaining filter means can take many forms including a cup containing the cake, a filter sleeve on the cake, and a screen on the bottom of the cake compartment 69. The filter means of this invention retains particles of 150 microns and above.

Preferably the filter means is an envelope or sleeve made of water-permeable laid hypochlorite-resistant fibers selected from the group consisting of nylon, polyethylene, polypropylene, polyethylene terephthalate, acrylonitrile, acylonitrile copolymers, polyvinyl chloride-acetate, polymethyl methacrylate, polyvinylidene chloride, asbestos, glass and mixtures thereof in which 40% to 100% of said fibers are thermoplastic, said laid fibers having a porosity from 200 to 800 cfm/sq.ft.; and preferably from 200 to 650 cfm/sq.ft. The preferred filter means has a porosity of about 400 to 600 cfm/sq.ft. and is made from a substrate of commercially available polyester. Examples of suitable ones are DELNET®, KENDAL®, and Santara®. Glass wool can also be used as a filter means in the practice of this invention.

The filter sleeve 1 on bleach cake 22 is preferably made of NOVANET® Stock 149–505, which is a porous thermoplastic hypochlorite resistant net material comprising uniformly spaced solid thick thermoplastic masses connected by oriented thermoplastic strands which are thinner than the solid masses. Such net materials are sold by Kendal Co.

The dosing dispenser is placed into the water tank of a toilet. The dispenser has means for passively receiving a dose volume of water from the tank. U.S. Pat. No. 4,208,747, Dirksing, issued June 24, 1980, is incorporated herein by reference for its teachings on passive dosing dispensers, their preparation and operation.

DETAILED DESCRIPTION OF THE DRAWING

It will be noted that dual dispensers are shown in the drawings. The surfactant cake 21 is isolated from the bleach cake 22. The dual dispensers are similar. Corresponding element numbers for the surfactant side are designated "S". Both dispensers have: vent holes 86, vent tubes 72, cake compartments 69, outlets 71, baffles 67, passageways 70, air bubble 3, air trap 76, reservoirs 5, and exit ports 7. The bleach cake vent tube 72 has a bulb 73.

The surfactant side has protrusion 79S to steady the cake. The baffle means must be designed to limit the size of the air lock bubble. The air bubble acts as a lock. The bubble 3 must be small enough to allow the dose volume of liquid above the baffle 67 to be discharged.

Note that inlet/outlet exit port 7 leads to first inlet/outlet passage way 32, which is in fluid communication with the bubble 3, which is in fluid communication with second inlet/outlet passageway 31 on the internal reservoir 5 side. Incline 33 of passageway 70 is sufficiently steep to shear excess air and vent same during refill. Passageway 70 leads to cake compartment 69 and vent tube 72.

The present invention is understood more clearly in the light of this disclosure and commonly owned U.S. Pat. No. 4,305,162, to Cornelisse, Jr., et al., issued Dec. 15, 1981, for "Passive Dosing Dispenser Enveloping Captive Air Bubble to Provide Product Isolation," incorporated herein by reference.

The reservoir section 5 below baffle 67 for the bleach cake preferably holds about 8 mls. It can hold from about 6 mls to about 12 mls. The amount of liquid in the dispenser above baffle 67 is about 1 ml to about 4 mls. This is equal to the dose volume for the bleach dispensed. The bubble 3 is smaller than 3S and baffle 67 is higher than 67S to thereby facilitate firing of a smaller doses while maintaining a 3:1 to 6:1 volumetric ratio of reservoir to dose volume.

The received water is routed to compartment 69 within the dispenser which contains the active. The dispenser has a lower-most edge means 62 for immersing only the lowermost portion of the cake to a predetermined depth in the received water to facilitate dissolving a portion of the cake for dispensing at a later time. The bleach cake in compartment 69 is enveloped in a filter sleeve 1 which contains the cake 22 and retains cake particles which become detached from the cake during use. The filter sleeve 1 is an envelope of laid fibers. Alternatively, a filter means can be a water-permeable cup (not shown) which is formed to the configuration of cake and which contains the cake. The cup will be made of a hypochlorite resistant material which will be positioned in the bottom of the compartment 69.

The liquid in the compartment 69 is drawn out each time the dispenser is fired, responsive to the flushing of the toilet. The quantity of fluid subject to discharge during the flush cycle is preferably 2 mls and the volume of solution in the dispenser including reservoir 5 is preferably from 7 to 16 mls, with 6 to 12 mls of this being in reservoir 5.

When the toilet is flushed, the external water level 75 in the toilet tank drops, causing water level 2 to drop. The air bubble 3 moves out exit port 7. The volume of liquid above baffle 67 is released from the dispenser. As soon as the liquid level falls from level 2 to the baffle 67, the discharge action is terminated. None of the liquid volume below baffle 67 will be discharged. The same applies for the surfactant side.

The reservoir 5 holds from about 6 mls up to about 12 mls; this volume of liquid insures that the concentration of bleach to be fired on the next flush will be potent in a rapid flush situation.

For the surfactant side, the reservoir section 5S preferably holds about 10 to about 12 mls. The dose volume for the surfactant solution is preferably about 5 mls, which is larger than the bleach dose.

The Surfactant Cake

Preferred surfactant cake compositions are disclosed in the commonly assigned U.S. patent application Ser. No. 452,544 now U.S. Pat. No. 4,476,046 of Wong, Sterling and Borcher, for "Buffered Alkali Earth Metal Surfactant Cakes for Dosing Dispenser," filed of even date, incorporated herein by reference.

The dimensions of a preferred bleach cake compartment 69 are about 9.1 cms × 5.0 cms × 2.2 cms. The dimensions of a preferred bleach cake 22 are 8.4 cms × 4.1 cms × 1.9 cms. The cake is sized to initially occupy most of the cake compartment space within the dispenser reservoir. The cake and the cake compartment preferably have cake surfaces and vertical compartment walls which are parallel to each other. It is important that there is at least 0.4 cm to 4 cms of free space between the vertical cake surfaces and the cake compartment walls. Some preferred free spaces are from 0.4 cm to 4 cms, 0.5 cm to 1.5 cms, and 0.5 cm to 2 cms.

The dispenser retains the hypochlorite solution in substantial isolation from the body of toilet tank water during quiescent periods in between flushes. Upon flushing of the toilet, an available chlorine level of from about 2 parts per million (ppm) to about 10 ppm is established in the toilet bowl water. The hypochlorite solution formed in the dispenser reservoir generally contains from about 0.5% to about 15% available chlorine. The average concentration of available chlorine there is typically from 9% to 15% and preferably 10% to 11%.

The solid cake is formulated to slowly dissolve and "gravity feed" into the water in the cake compartment 69 of the dispenser and disappear after the toilet has been flushed a sufficient number of times to exhaust all of the hypochlorite in the cake. It is important, for a more uniform delivery of bleach, that the dispenser has a means to maintain in the reservoir section 9 a volume of aqueous liquid of about 6 mls to about 12 mls. The dispensed dose volume should be about ⅓ to about 1/6 of the reservoir volume. Again, the idea is to deliver about 1 ml to about 4 mls, preferably about 1.5 to 3 mls of concentrated hypochlorite solution. This is accomplished by adjusting the elements of the dispenser shown in the drawings. It is important to design the elements of the dispenser so that the complete intended doses will discharge.

The Bleach Cake

The calcium hypochlorite cake of this invention is preferably a tableted solid composition comprising: (I) from about 10% to about 98% of a substantially stable calcium hypochlorite; (II) an effective amount of a water-soluble calcium hypochlorite cake swelling control salt selected from the group consisting of lithium hypochlorite material (Form $2^R$), lithium hydroxide, lithium sulfate, lithium chloride and other water-soluble lithium salts, and mixtures thereof; and (III) the balance between a mixture of salts and other by-product materials normal to the manufacture of calcium hypochlorite. See the examples for preferred compositions.

Bleach Cake Preparation

The compacted solid calcium hypochlorite cake compositions of this invention may be prepared by conventional compacting procedure. For example, granules of calcium hypochlorite, e.g., $HTH^R$, and granules of the selected swelling control salts are mixed together, and this mixture is then pressed into a cake with a compacting machine. The granules are generally in a size range of from about 50 microns to about 1,000 microns prior to compacting. The compacted solids can also be formed by tabletting, "slugging," Chilsonating, or otherwise converting the granular hypochlorite mixture into compacted forms. Compacting may be accomplished at pressures of from about 0.5 tons/square inch to about 200 tons/square inch, preferably from about 1.0 tons/square inch to about 50 tons/square inch to about 5.0 tons/square inch. The compacting can be done on any conventional compacting apparatus, e.g., a Stokes Model R4 Tablet Press. The compacted cakes generally have a specific gravity of about 1.3 to about 2.3, preferably from about 1.5 to about 2.0. The cakes weigh from 45 gm to 120 gm. A preferred cake is disclosed in commonly owned U.S. patent application Ser. No. 355,984, J. M. Mueller and L. E. Small, filed Mar. 8, 1982, now abandoned, incorporated herein by reference in its entirety.

The cake is formed into shapes with dimensions appropriate to fit the cake compartment of the gravity feed dosing dispenser which holds the cake.

EXAMPLE I

A preferred bleach cake with a particle retaining filter sleeve completely enveloping the cake has the following make up:

Formulation

| | |
|---|---|
| HTH [Ca(OCl)$_2$] | 92% |
| Li$_2$SO$_4$—Monohydrate | 8% |

Dimensions & Physical Properties

| | |
|---|---|
| Length | 3.3" = 8.38 cm |
| Width | 1.61" = 4.09 cm |
| Thickness | 0.76" = 1.93 cm |
| Weight | 110 g |
| Density | 1.76 gms/cc |
| Grams of AvCl$_2$ (available chlorine) | 70 g |

Filter Sleeve Material

Nonwoven Polyester (Kendall Corp.), Style #149–505

| | |
|---|---|
| Length | 3.5" = 8.89 cm |
| Width | 2.5" = 6.35 cm |
| Thickness | 0.010" = 0.03 cm |
| Porosity | 227 cfm/ft$^2$ ≈ 69.2 m$^3$ per min/m$^2$ |
| Weight | 40 g/sq.yd. = 47.8 gm/m$^2$ |

EXAMPLE II

Another bleach cake is made with 95% HTH and 5% lithium sulfate anhydrous. It is also used in a filter sleeve like the one described above and shown in the drawing.

Dispensers equipped with the cakes of Examples I and II operated without dispenser clogging and withheld particles from the bleach cake passing through the dispenser into the toilet tank water or clogging up the dispenser.

The preferred invention is: an article of manufacture comprising a dosing dispenser containing a solid cake of either Example I or Example II. The dispenser receives from 7 to 16 mls of liquid and has a means to maintain in a reservoir a volume of aqueous liquid which is 6 mls to 12 mls and dispenses 1 ml to 4 mls dose of said liquid. The reservoir liquid and said volumetric ratio is from 3:1 to 6:1. The article of manufacture of this invention discloses a dose of bleach having an average concentration of 9% to 15% of hypochlorite active, and provides a substantially uniform concentration of hypochlorite solution for each dispensing cycle for the life of the cake.

What is claimed is:

1. An article of manufacture comprising a bottom feed dosing dispenser comprising: a solid cake (22) of water-soluble calcium hypochlorite, a cake compartment (69), an inlet/outlet exit port (7), a first inlet-outlet passageway (32), a second inlet/outlet passageway (31), a reservoir (5), dose volume baffle (67), incline (33), passageway (70), said dispenser containing said solid cake (22) within said cake compartment (69), said dispenser is designed for allowing a dose volume of aqueous liquid to be routed through said inlet/outlet exit port (7), said first inlet/outlet passageway (32), said second inlet/outlet passageway (31), said reservoir (5), said dose volume baffle (67), said incline (33), said passageway (70) and into said compartment with each dispensing cycle, said dispenser including a lower most edge means (62) for initially immersing only a lowermost portion of said cake (22) to a predetermined depth in the aqueous liquid to facilitate dissolving a portion of said cake (22) for dispensing at a later time; said cake (22) comprising a substantially completely water-soluble solid weighing from 45 gms to 120 gms and having a density of from 1.5 to 2.3 gms/cc; said cake compartment containing sufficient free space to allow the cake (22) to swell and gravity feed freely by dissolution into the aqueous liquid; said dispenser is designed to receive and contain a total of from 7 to 16 mls of aqueous liquid and to form a bubble (3) between said first inlet/outlet passageway (32) and said dose volume baffle (67); and said incline 33 and passageway 70 are designed to cooperate:

(a) to limit the size of the bubble which acts as a lock to isolate toilet tank water (75) from the aqueous liquid inside the dispenser reservoir (5), (b) to maintain in said reservoir (5) a constant minimum volume of the aqueous liquid of from about 6 mls to 12 mls, and (c) to fully dispense a small 1 ml to about 4 mls dose of the aqueous liquid;

wherein the volumes of the reservoir liquid (b) and said dose (c) have a volumetric ratio of from 3:1 to 6:1, and wherein the reservoir liquid has an average concentration of from about 9% to about 15% of said hypochlorite, and wherein said dosing dispenser provides a substantially uniform concentration of hypochlorite solution for each dispensing cycle for the life of the cake.

* * * * *